US010419478B2

(12) United States Patent
Syme et al.

(10) Patent No.: US 10,419,478 B2
(45) Date of Patent: Sep. 17, 2019

(54) IDENTIFYING MALICIOUS MESSAGES BASED ON RECEIVED MESSAGE DATA OF THE SENDER

(71) Applicant: Area 1 Security, Inc., Redwood City, CA (US)

(72) Inventors: Philip Syme, Ellicott City, MD (US); Oren Falkowitz, Redwood City, CA (US); Michael Flester, Highland, MD (US)

(73) Assignee: Area 1 Security, Inc., Redwood City, CA (US)

( * ) Notice: Subject to any disclaimer, the term of this patent is extended or adjusted under 35 U.S.C. 154(b) by 0 days.

(21) Appl. No.: 15/642,018

(22) Filed: Jul. 5, 2017

(65) Prior Publication Data
US 2019/0014143 A1 Jan. 10, 2019

(51) Int. Cl.
*H04L 29/06* (2006.01)
*H04L 12/58* (2006.01)

(52) U.S. Cl.
CPC .......... *H04L 63/1483* (2013.01); *H04L 51/12* (2013.01); *H04L 63/126* (2013.01); *H04L 63/1441* (2013.01)

(58) Field of Classification Search
CPC ... H04L 63/1483; H04L 63/126; H04L 63/12; H04L 63/1441
See application file for complete search history.

(56) References Cited

U.S. PATENT DOCUMENTS

| | | | | |
|---|---|---|---|---|
| 7,548,956 B1 * | 6/2009 | Aoki | ............... | G06Q 10/107 709/204 |
| 8,566,938 B1 * | 10/2013 | Prakash | ............... | H04L 63/1483 726/22 |
| 2003/0167402 A1 * | 9/2003 | Stolfo | ............... | H04L 51/12 726/23 |
| 2003/0172292 A1 * | 9/2003 | Judge | ............... | G06F 21/554 726/23 |
| 2004/0177120 A1 * | 9/2004 | Kirsch | ............... | H04L 29/06 709/206 |
| 2005/0080855 A1 * | 4/2005 | Murray | ............... | H04L 51/12 709/206 |
| 2006/0168024 A1 * | 7/2006 | Mehr | ............... | H04L 51/12 709/206 |
| 2008/0133672 A1 * | 6/2008 | Gillum | ............... | G06Q 10/107 709/206 |

(Continued)

Primary Examiner — Robert B Leung
(74) Attorney, Agent, or Firm — Hickman Palermo Becker Bingham LLP

(57) ABSTRACT

Systems and methods for providing an improvement to computer security relating to electronic digital messages are provided. In an embodiment, a computing device receives an electronic digital message that is sent to a receiving account. The computing device identifies a sending account associated with the electronic digital message and from which the electronic digital message was sent. The computing device obtains metadata relating to the sending account, the metadata including received message data that is related to a number of messages that have been received by the sending account. The computing device determines that the sending account satisfies a received message criteria based, at least in part, on the received message data and, in response, performs a responsive action relating to the electronic digital message.

21 Claims, 3 Drawing Sheets

(56) References Cited

U.S. PATENT DOCUMENTS

| | | | | |
|---|---|---|---|---|
| 2009/0037546 A1* | 2/2009 | Kirsch | .................. | G06Q 10/107 |
| | | | | 709/206 |
| 2009/0307313 A1* | 12/2009 | Wang | ...................... | G06F 15/16 |
| | | | | 709/206 |
| 2009/0327430 A1* | 12/2009 | Colvin | .................... | H04L 51/12 |
| | | | | 709/206 |
| 2011/0119258 A1* | 5/2011 | Forutanpour | ........ | G06Q 10/107 |
| | | | | 707/723 |
| 2012/0131107 A1* | 5/2012 | Yost | ........................ | H04L 51/12 |
| | | | | 709/206 |
| 2014/0020047 A1* | 1/2014 | Liebmann | ............... | H04L 63/20 |
| | | | | 726/1 |
| 2014/0325007 A1* | 10/2014 | Dulitz | .................... | H04L 51/12 |
| | | | | 709/206 |
| 2018/0091478 A1* | 3/2018 | Jakobsson | ........... | H04L 63/0245 |

* cited by examiner

IDENTIFYING MALICIOUS MESSAGES BASED ON RECEIVED MESSAGE DATA OF THE SENDER

FIELD OF THE INVENTION

The present disclosure relates to computer security techniques applicable to computers that send and receive electronic digital messages over a network.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

One of the largest threats to computing devices includes malicious messages sent over a network. Often these threats appear in the form of a message containing attachments with malicious code and/or hyperlinks to malicious uniform resource locators (URLs). The malicious code and/or malicious URLs may cause a computing device to download viruses or to send personal data to other computing devices.

Due to the increased usage of electronic messaging and the increased threat of malicious messages, message security has become extremely important for computing devices. Many messaging security systems can analyze hyperlinks and attachments to determine if they contain any known viruses or links to known malicious URLs.

While virus scanners may identify malicious attachments in messages, many types of malicious messages are more difficult to identify. A malicious message may include no attachments or hyperlinks, but instead convince the recipient to send a response or to perform a particular action. For instance, a malicious message may identify the sender as a security company and request remote access to the computing device of the recipient to fix an invented problem with the computing device. These types of messages, also known as phishing messages, are more difficult to identify as malicious as they may not contain URLs or attachments.

The malicious message problem is most prevalent in e-mail systems as identifiers of recipient e-mail accounts are readily available. The malicious message problem additionally exists in various messaging services, such as dating applications where fake accounts may be easily generated for sending phishing messages.

One solution to the malicious message problem is to track the names of messaging accounts that have sent out phishing messages. If a computing device can determine that a message has been sent to many recipients or that a messaging account has sent out phishing messages in the past, the account and/or the domain for the account may be added to a blacklist. Future messages received from a blacklisted account may be immediately quarantined or deleted, thereby protecting the computing device associated with the recipient account.

The approach of blacklisting known phishing accounts was most effective when messaging accounts were relatively difficult to obtain. As storage capacity has increased, messaging account providers have made the process of obtaining a messaging account relatively simple. Thus, the prior system of identifying phishing accounts based on the number of messages they have sent can be overcome by obtaining individual accounts for sending a relatively small number of phishing messages. If an account has only sent a single message, the account may be identified as having a clean sending reputation even though the account was created for sending a malicious message.

Thus, there is a need for a system or method which can identify phishing accounts and/or malicious messages from a generated account with a clean sending reputation.

DETAILED DESCRIPTION

Figure 1:
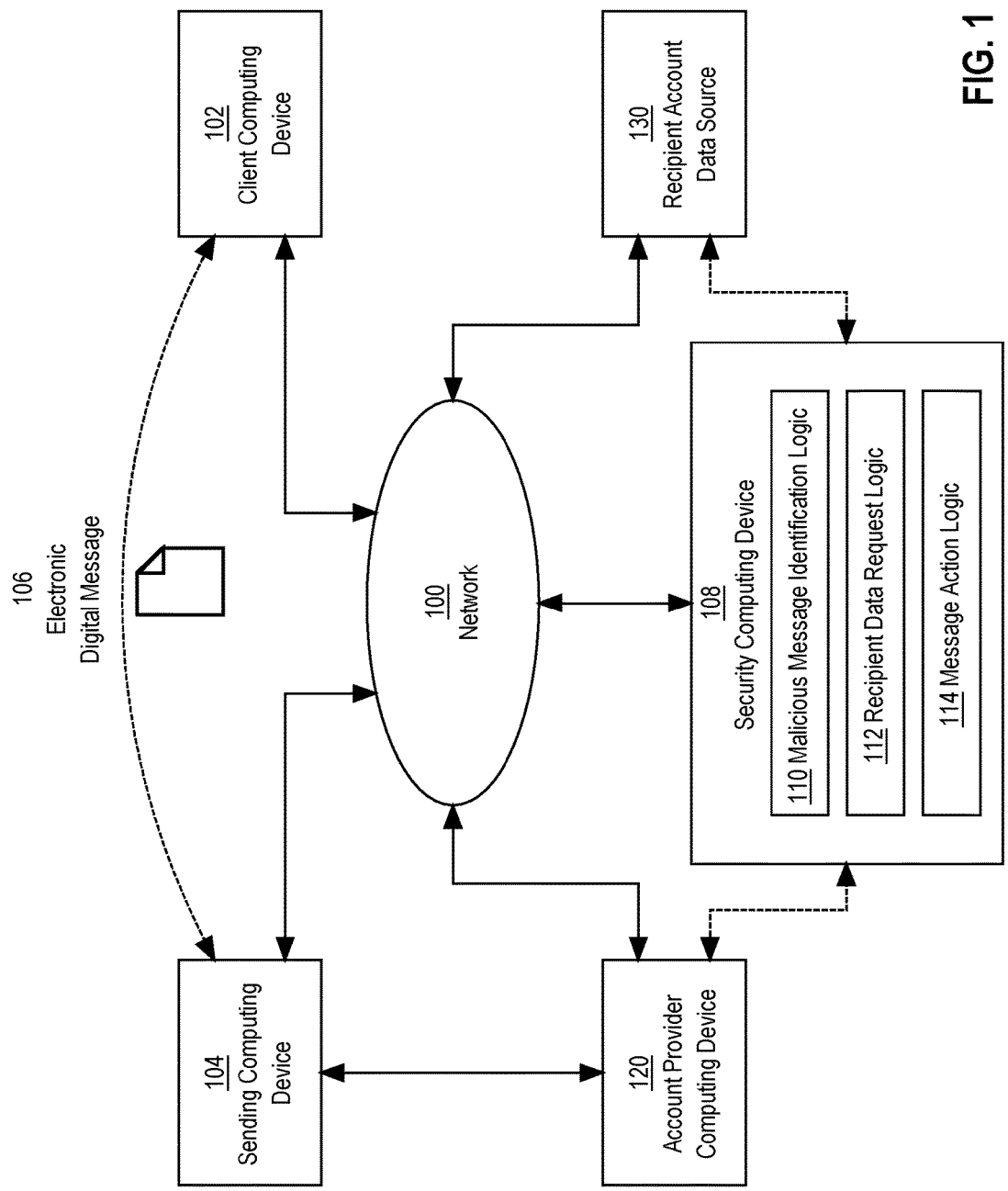
FIG. 1 depicts an example system in which the techniques described herein may be implement according to an embodiment.

In the following description, for the purposes of explanation, numerous specific details are set forth in order to provide a thorough understanding of the present disclosure. It will be apparent, however, that the embodiments may be practiced without these specific details. In other instances, well-known structures and devices are shown in block diagram form in order to avoid unnecessarily obscuring the present disclosure.

General Overview

Systems and methods for identifying phishing accounts and/or malicious messages are described herein. According to an embodiment, a computing device receives an electronic digital message sent from a sending account. The computing device obtains data related to a number of messages that have been received by the sending account. By obtaining data regarding messages received by the sending account, the computing device is able to overcome the clean sending reputation by determining that the account has received so few messages that it is likely a false account. Based on the obtained data, the computing device determines whether the sending account satisfies a received message criteria. If the sending account satisfies the received message criteria, a responsive action is taken. The responsive action may include quarantining the message, deleting the message, identifying the account as a phishing account, sending a notification or alert, and/or performing any other security measures with response to the sending account and/or the message.

In an embodiment, a method comprises receiving an electronic digital message that is directed to a receiving account; identifying a sending account associated with the electronic digital message and from which the electronic digital message was sent; obtaining metadata relating to the sending account, the metadata including received message data that is related to a number of messages that have been received by the sending account; determining that the sending account satisfies a received message criteria based, at least in part, on the received message data; in response to the determining, performing a responsive action relating to the electronic digital message.

In an embodiment, a method comprises receiving an e-mail message that is directed to a receiving account; identifying a sending account associated with the e-mail message and from which the e-mail message was sent; transmitting, to a host computer of the sending account, a request to obtain a count of messages received by the sending account, and receiving the count of messages in response to the request; in response to determining that the count of messages received by the sending account is less than a specified number, performing a responsive action relating to the e-mail message, the responsive action comprising one or more of: causing the e-mail message to be quarantined; marking the sending account as a potential phishing account; increasing a value identifying a likelihood that the sending account is a phishing account; analyzing one or more hyperlinks in the e-mail message; scanning one or more attachments in the e-mail message for viruses; dropping and not delivering the e-mail message to the receiving account; transmitting one or more notifications or alerts relating to the e-mail message.

System Overview

FIG. 1 depicts an example system in which the techniques described herein may be implemented according to an embodiment.

In the example of FIG. 1, a client computing device 102, a sending computing device 104, a security computing device 108, an account provider computing device 108, and a recipient account data source 130 are communicatively coupled to a data communications network 100. The network 100 broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The client computing device 102, sending computing device 104, security computing device 108, account provider computing device 108, recipient account data source 130, and other elements of the system may each comprise an interface compatible with the network 100 and are programmed or configured to use standardized protocols for communication across the networks such as TCP/IP, Bluetooth, and higher-layer protocols such as HTTP, TLS, and the like.

FIG. 1 depicts client computing device 102, sending computing device 104, security computing device 108, account provider computing device 108, and recipient account data source 130 in FIG. 1 for the purpose of illustrating a clear example. However, in other embodiments, more or fewer computers may accomplish the functions described herein. For example, security computing device 108 may interact with account provider computing device 108, recipient account data source 130, both account provider computing device 108 and recipient account data source 130, or neither of them. As another example, tasks described herein as being performed by security computing device 108 may be performed by client computing device 104.

Client computing device 102 is a computer that includes hardware capable of communicatively coupling client computing device 102 to one or more other computers, such as sending computing device 104 and/or security computing device 108 over one or more service providers. For example, client computing device 102 may include a network card that communicates with sending computing device 104 and/or security computing device 108 through a home or office wireless router (not illustrated in FIG. 1) coupled to an internet service provider. Client computing device 102 may be a smart phone, personal computer, tablet computing device, PDAs, laptop, or any other computing device capable of transmitting and receiving information and performing the functions described herein.

Sending computing device 104 may be any computing device capable of sending a message over a network to client computing device 102. Sending computing device 104 may be any of a smart phone, personal computer, tablet computing device, PDAs, laptop, or any other computing device capable of transmitting information.

In an embodiment, sending computing device 104 sends an electronic digital message 106 to client computing device 102 using a mail transfer agent (MTA), simple mail transfer protocol (SMTP) server or software or a similar facility. The message may conform to one or more messaging protocols, such as instant messaging protocols, SMTP for email, and/or short message service (SMS) messages. The electronic digital message may originate from a messaging account associated with sending computing device 104. For example, if the message is an SMS message, the messaging account may be a phone number of a cellular phone. As another example, if the message is an email message, the messaging account may comprise an email address from which the message was sent.

Security computing device 108 may be implemented using a server-class computer or other computer having one or more processor cores, co-processors, or other computers. In some embodiments, security computing device 108 may also include a client computing device, such as a smart phone and/or laptop computer. Security computing device 108 may provide one or more security applications to client computing device 102. While FIG. 1 depicts a message sent from sending computing device 104 directly to client computing device 102 for depicting a clear example, in other embodiments security computing device 108 may receive the message either directly or indirectly from sending computing device 104.

Security computing device 108 additionally stores malicious message identification logic 110, recipient data request logic 112, and message action logic 114. Malicious message identification logic 110, recipient data request logic 112, and message action logic 114 may each comprise a set of one or more pages of main memory, such as RAM, in a computing device into which executable instructions have been loaded and which when executed cause the computing device to perform the functions or operations that are described herein with reference to those modules. For example, the malicious message identification logic 110 may comprise a set of pages in RAM that contain instructions which when executed cause the security computing device 108 to perform a method for reducing the storage size of a weight matrix, such as the example method described in FIG. 2.

The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, malicious message identification logic 110, recipient data request logic 112, and message action logic 114 also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the security computing device 108.

Account provider computing device 120 provides a messaging account to sending computing device 104. In an embodiment, account provider computing device 120 may also provide a messaging account to client computing device 102. For example, account provider computing device 120 may provide an instant messaging service which allows a first user with an account provided by account provider computing device 120 to exchange messages with a second user with an account provided by account provider computing device 120. Additionally or alternatively, client computing device 102 may have a messaging account provided by an account provider separate from account provider computing device 120. For example, account provider computing device 120 may provide an email account to sending computing device 104 while client computing device 102 is provided an email account from a different account provider.

In an embodiment, account provider computing device 120 provides account information to security computing device 108. For example, security computing device 108 may request information regarding an account from which the electronic digital message 106 was sent. Account provider computing device 120 may send the requested information to security computing device 108. In some embodiments, actions performed by account provider computing device 120 and security computing device 108 are performed by the same computing device. For example, an account provider computing device 120 which provides accounts to both the sending computing device 104 and the client computing device 102 may monitor messages received by the client computing device 102 to determine if the sending account is a possible phishing account.

In an embodiment, recipient account data source 130 provides data identifying a plurality of recipient accounts to security computing device 108. For example, recipient account data source may store a list of known recipient accounts. In response to receiving a request from security computing device 108, the recipient account data source may send the list of known recipient accounts to security computing device 108.

Identifying Potential Phishing Account and/or Malicious Messages

Figure 2:
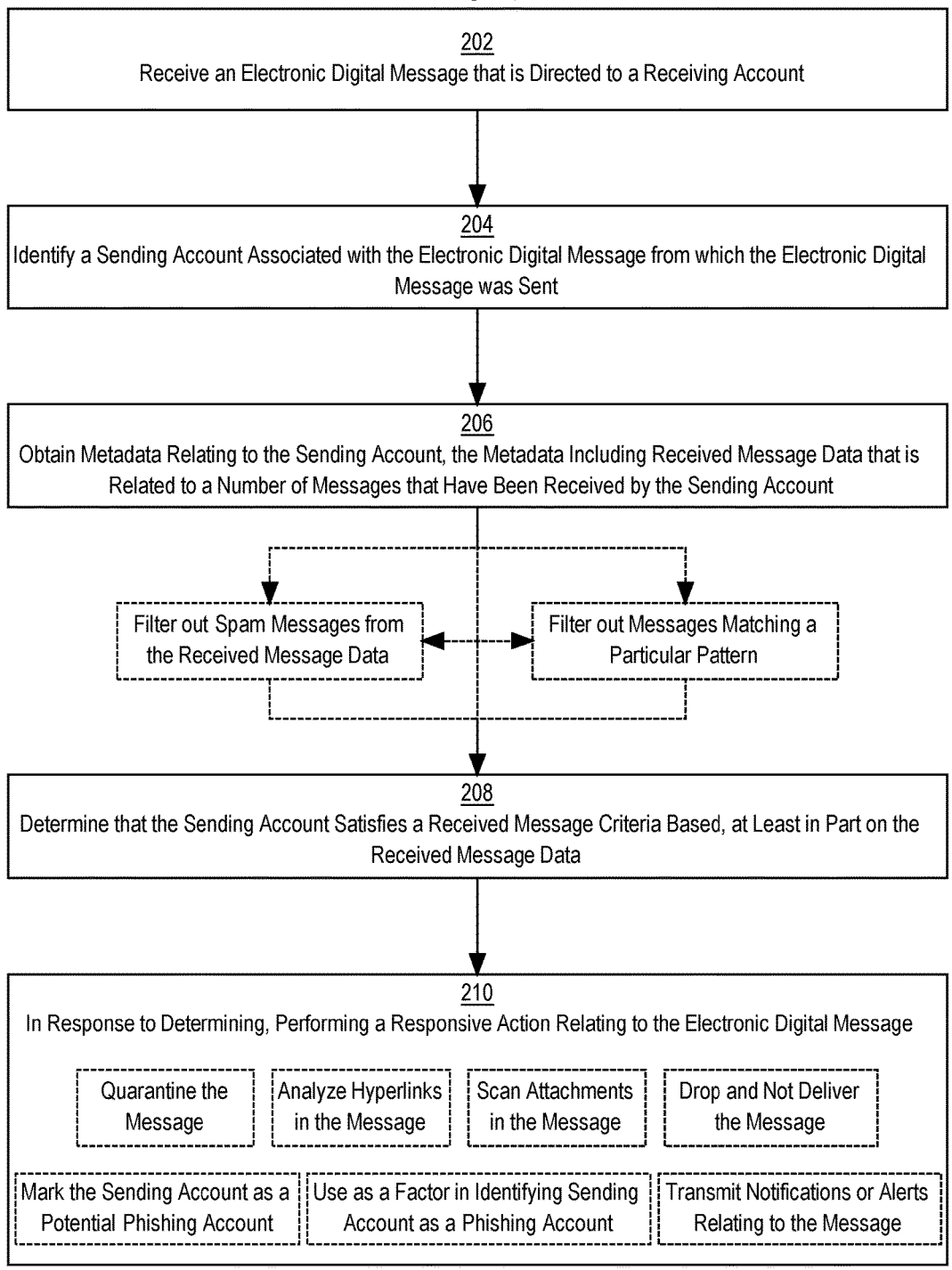
FIG. 2 depicts a method for identifying potential phishing accounts and/or malicious messages.

FIG. 2 depicts a method for identifying potential phishing accounts and/or malicious messages. The dotted lines in FIG. 2 refer to optional embodiments which may be implemented on their own or in combination. For example, embodiments may include no filtering of messages, filtering out of only spam messages, filtering out of only messages that fit a particular pattern, or filtering out both spam messages and messages that fit a particular pattern.

At step 202, an electronic digital message that is directed to a receiving account is received. For example, a message may be sent from sending computing device 104 to client computing device 102. The message may conform to one or more messaging protocols, such as instant messengers, email, and/or short message service (SMS) messages.

In an embodiment, the client computing device 102 receives the message and sends the message to security computing device 108. For example, the security computing device 108 may provide messaging security services for client computing device by analyzing messages received at client computing device 102. In some embodiments, the client computing device 102 performs the determining functions of the security computing device 108 without sending the message to the security computing device 108.

Additionally or alternatively, the security computing device 108 may intercept the message before it reaches client computing device 102. If the security computing device 108 takes one or more particular actions, the client computing device 102 may not receive the message. For example, the security computing device 108 may delete the message or quarantine the message instead of sending the message to the client computing device 102.

At step 204, a sending account associated with the electronic digital message from which the electronic digital message was sent is identified. For example, either security computing device 108 or client computing device 102 may identify an email account from which an email was sent using metadata attached to the email. Additionally or alternatively, security computing device 108 may be programmed or configured to identify the sending account from one or more fields of the message. In embodiments where the account provider computing device 120 performs steps 204-210, the account provider computing device may identify the sending account from which the message was sent.

Obtaining Received Message Data

At step 206, metadata relating to the sending account is obtained, the metadata including received message data that is related to a number of messages that have been received by the sending account. For example, security computing device 108 may receive data identifying a number of messages that were received by the sending account. As another example, security computing device 108 may receive data identifying a number of messages viewed by the sending account.

In embodiments where the account provider computing device 120 performs step 204-210, the account provider computing device may store data identifying received messages for the sending account as the messages are received. For example, an account provider of an instant messaging service may monitor messages that are sent and received by accounts of the instant messaging service and store data identifying how many messages were sent or received. In an embodiment, the account provider may also store data identifying how many messages have been viewed by a particular account. For example, when an account user selects a message to read, the computing device may send a notification to the account provider computing device identifying that the message was read.

In embodiments where the security computing device 108 performs steps 204-210, the security computing device 108 may request the metadata from one or more external sources. The one or more external sources may include the account provider computing device 120, the recipient account data source 130, one or more other client computing devices, and/or other data sources the store information describing message receipt history for one or more accounts.

In an embodiment, the security computing device 108 receives the metadata from the account provider computing device. For example, the security computing device 108 may receive the message sent from the sending computing device 104 and identify the sending account for the message. The security computing device 108 may then send a request for received message data to the account provider computing device 120 wherein the message identifies the sending account. The account provider computing device 120 may then send the metadata to security computing device 108.

The metadata may comprise values identifying a number of messages received for the identified account, a number of messages viewed by the identified account, and/or a number of messages received by the identified account that have been marked as 'spam' messages. Additionally or alternatively, the account provider computing device 120 may send more detailed information regarding the sending account, such as identifiers of each message received by the sending account, metadata associated with messages received by the sending account such as date and time of the received messages, identifiers of senders of the received messages, subject lines of received messages, and/or account data of the sending account, such as the date the account was created.

In an embodiment, the security computing device 108 may initially identify the account provider computing device 120 for requesting additional data. For example, the security computing device 104 may communicate with a plurality of email providers. Based on the domain name of a sent email, the security computing device 104 may identify the email provider associated with that domain name. The security computing device 104 may then send a message to a computing device associated with the email provider requesting received message data for the sending account.

In an embodiment, the security computing device 108 may receive the metadata from recipient account data source 130. For example, recipient account data source 130 may store data identifying messaging accounts that have been identified as possible recipients of messages, advertisements, or other promotions. An example of the stored data is a spam list which lists known email accounts that can be sent particular types of spam email messages. The recipient account data source 130 may accumulate data identifying messaging accounts from various other data providers, such as subscribed newsletters and online services.

In an embodiment, the security computing device 108 may receive the metadata through receipt of a plurality of second messages. The security computing device 108 may receive a plurality of messages sent to a plurality of different recipients. As an example, security computing device 108 may monitor received messages for a plurality of recipient accounts in order to provide messaging security services. Additionally or alternatively, security computing device 108 may provide a plurality of messaging accounts to a plurality of recipient accounts, thereby allowing the security computing device 108 to monitor incoming messages.

Security computing device 108 may be programmed or configured to identify secondary recipients for each of the plurality of messages. For example, security computing device 108 may identify additional recipients, carbon copied (CC) recipients, and/or blind carbon copied (BCC) recipients in the plurality of messages. The security computing device 108 may store data identifying the secondary recipients of the messages. For example, the security computing device 108 may store a data table comprising a column of identifiers of secondary recipients and a column indicating a number of times identifiers were listed as secondary recipients. Additionally, the security computing device 108 may store data indicating a number of messages including the secondary recipients that were marked as spam messages.

Security computing device 108 may request the metadata in response to receiving the messages and/or may generally store the metadata. For example, in the case of obtaining specific data from an account provider, the security computing device 108 may request the data from the account provider when the message is received. In the case of the recipient list received from the recipient account data source, the security computing device 108 may request the recipient list periodically. Thus, in different embodiments, the security computing device 108 may receive the metadata at different points in time.

Received Message Criteria

At step 208, a determination is made that the sending account satisfies a received message criteria based, at least in part, on the received message data. The message criteria may differ depending on the type of metadata used to determine if the message criteria has been satisfied. For example, in an embodiment the metadata identifies, for the sending account, a number of messages received and/or viewed by the sending account. The message criteria may define a threshold number of messages. For example, a threshold of one message may defined, such that the sending account satisfies the received message criteria as long as the sending account has received less than one message and/or as the sending account has viewed less than one message.

In an embodiment, the identified received messages for the sending account are filtered before determining whether the received message criteria has been satisfied. As an example, security computing device 108 may filter out messages identified as spam from the received messages prior to determining whether the received message criteria has been satisfied. Thus, if a received message criteria is set to one received message, then a sending account which has received twenty messages identified as spam and zero other messages may be determined to satisfy the received message criteria.

In an embodiment, the filtering of the identified received messages includes identifying particular patterns of received messages and filtering out messages that fit the particular pattern. As an example, a computing device may be programmed or configured to identify messages received within an hour of the account's creation, thereby filtering out welcome messages. As another example, a computing device may be programmed or configured to identify patterns of abnormal activity for the sending account. For instance, if the sending account generally receives no messages, but received a large number of messages on a particular day, the computing device may filter out the messages received on the particular day when determining if the sending account satisfies the received message criteria.

By initially filtering out particular messages, the system is able to avoid considering false positives while determining if the received message criteria has been met. For example, many types of messaging accounts will receive at least one message when the account is activated from the account provider. Additionally, spam messages may be sent to new accounts fairly quickly. By filtering out these initial messages, a computing device can identify accounts that are receiving a low number of legitimate messages, thereby identifying an account that has possibly been created for malicious purposes. The methods described herein may also be used to filter out abnormal activity caused by a user attempting to circumvent the system. Thus, an abnormal number of messages received in a given day may be filtered out when determining if the received message criteria has been met.

Additionally or alternatively, the system may store multiple received message thresholds for different types of messages. For example, the system may store a first received message threshold for messages identified as spam messages and a second received message threshold for messages that have not been identified as spam messages. If a number of spam messages received by the sending account is less than the spam received message threshold and the number of other messages received is less than the other received message threshold, the system may determine that the sending account satisfies the received message criteria. If either the number of spam messages received by the sending account exceeds the spam received message threshold or the number of other messages received exceeds the other received message threshold, than the system may determine that the sending account does not satisfy the received message criteria.

In an embodiment, the received message criteria is defined as a number of messages that have been viewed by the sending account. For example, an account provider may distinguish between messages that have been received by an account and messages with which a user of the account has interacted. If the account does not comprise any message that has been marked as 'read' or 'viewed', the account provider may be programmed or configured to determine that the account has satisfied the received message criteria. Thus, if an account in a messaging application has received a large number of messages but has viewed none of them, the account may be identified as satisfying the received message criteria.

In an embodiment, the received message criteria are satisfied if the sending account is not identified in data received from a recipient data source. For example, the recipient data source may provide data identifying a plurality of messaging accounts that have been identified as possible recipients of messages, advertisements, or other promotions. If a messaging account is identified in the received data list, then a computing device may determine that the messaging account does not satisfy the received message criteria. Alternatively, if the messaging account is not identified in the received data list, then a computing device may determine that the messaging account does satisfy the received message criteria.

In an embodiment, the received message criteria are satisfied if the sending account is not identified as a secondary recipient in any of a plurality of second messages. A computing device may store data identifying a plurality of secondary recipients of a plurality of messages. For example, an e-mail account provider which provides an e-mail account to the client computing device may identify secondary recipients of messages received by other accounts of the e-mail account provider. The computing device may determine whether the sending account is identified as a secondary recipient of any of the second messages. If the sending account is not identified as a secondary recipient of any of the second messages, the computing device may determine that the sending account satisfies the received message criteria.

Response Actions

At step 210, in response to the determination, a responsive action relating to the electronic digital message is performed. For example, a security computing device may perform a responsive action with respect to the electronic digital message in response to determining that the sending account satisfies the received message criteria. The severity of the responsive action may range from using the satisfaction of the received message criteria as one factor in determining whether to perform a second action to removing the electronic digital message.

In an embodiment, the responsive action comprises causing an e-mail message to be quarantined. For example, a security computing device may delete the e-mail message from an e-mail server and store the e-mail message in a quarantine folder. Additionally or alternatively, the security computing device may intercept the e-mail message before it reaches the e-mail server and place the e-mail message in a quarantine folder. The security computing device may then send a notification to the client computing device identifying the e-mail message as quarantined.

In an embodiment, the responsive action comprises storing data identifying the sending account as a possible phishing account. A computing system may then use the stored data to monitor messages sent from the account, notify a user that the message may have originated from a phishing account, and/or utilize the data with one or more other factors to determine whether another responsive action should be taken.

In an embodiment, the responsive action comprises analyzing one or more hyperlinks in the message and/or scanning one or more attachments in a message. For example, a security computing device may use the received message criteria to determine whether to examine attachments or hyperlinks in a received message. Thus, if the sending account satisfies the received message criteria, the computing device may analyze one or more hyperlinks to determine if the one or more hyperlinks are malicious and/or scan one or more attachments to determine whether the one or more attachments contain malicious code, such as viruses.

In an embodiment, the responsive action comprises sending one or more hyperlinks from the message and/or one or more attachments in the message to a separate computing device. For example, the security computing device may send an attachment to a separate computing device with a request to scan the attachment to determine whether the attachment contains malicious code, such as viruses. Thus, the security computing device may be programmed or configured to perform an initial determination as to whether messages and/or message contents need to be scanned, analyzed, or otherwise reviewed and send the messages and/or message contents to an outside service for performing the analysis, scanning, and/or review.

In an embodiment, the responsive action comprises increasing a value identifying a likelihood that the sending account is a phishing account and/or that the message contains malicious content. For example, the security computing device may be programmed or configured to identify phishing accounts and/or malicious messages. The security computing device may use the received message criteria as a factor in determining whether a messaging account is a phishing account or whether a message is a malicious message. Other factors may include a messaging history of the sending account, content of the message, existence of hyperlinks and attachments, and domain names that have been either blacklisted or whitelisted. The security computing device may thus store a data value identifying a likelihood that the sending account is a phishing account and/or that the electronic digital message is malicious. The security computing device may increase that value in response to determining that the sending account satisfies the received message criteria. Additionally or alternatively, the received message criteria may be used to overcome a clean sending reputation for determining whether a sending account is a phishing account and/or determining whether a message contains malicious content.

In an embodiment, the responsive action comprises dropping and not delivering the message to the receiving account. For example, the security computing device may initially receive a message that is sent to a receiving account of the client computing device. If the security computing device determines that the sending account satisfies the received message criteria, the security computing device may be programmed or configured to drop the message and not forward the message to the receiving account. Alternatively, if the sending account does not satisfy the received message criteria, the security computing device may forward the message to the receiving account.

In an embodiment, the responsive action comprises transmitting one or more notifications or alerts relating to the message. For example, the security computing device may send an alert to the client computing device indicating that the message may contain malicious content. Additionally or alternatively, the security computing device may send a notification or alert to an account provider for the receiving account indicating that the message may be malicious and/or to an account provider for the sending account indicating that the sending account may be a phishing account.

In an embodiment, particular domains and or accounts may be whitelisted such that messages sent from those accounts and/or from accounts in those domains are excluded from a particular action regardless of whether the sending account satisfies the received message criteria. For example, the security computing device may store data identifying a plurality of whitelisted domains. In response to determining that the sending account satisfies the received message criteria, the security computing device may determine whether the sending account belongs to one of the whitelisted domains. If the sending account does not belong to one of the whitelisted domains, the security computing device may perform one or more of the responsive actions described herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
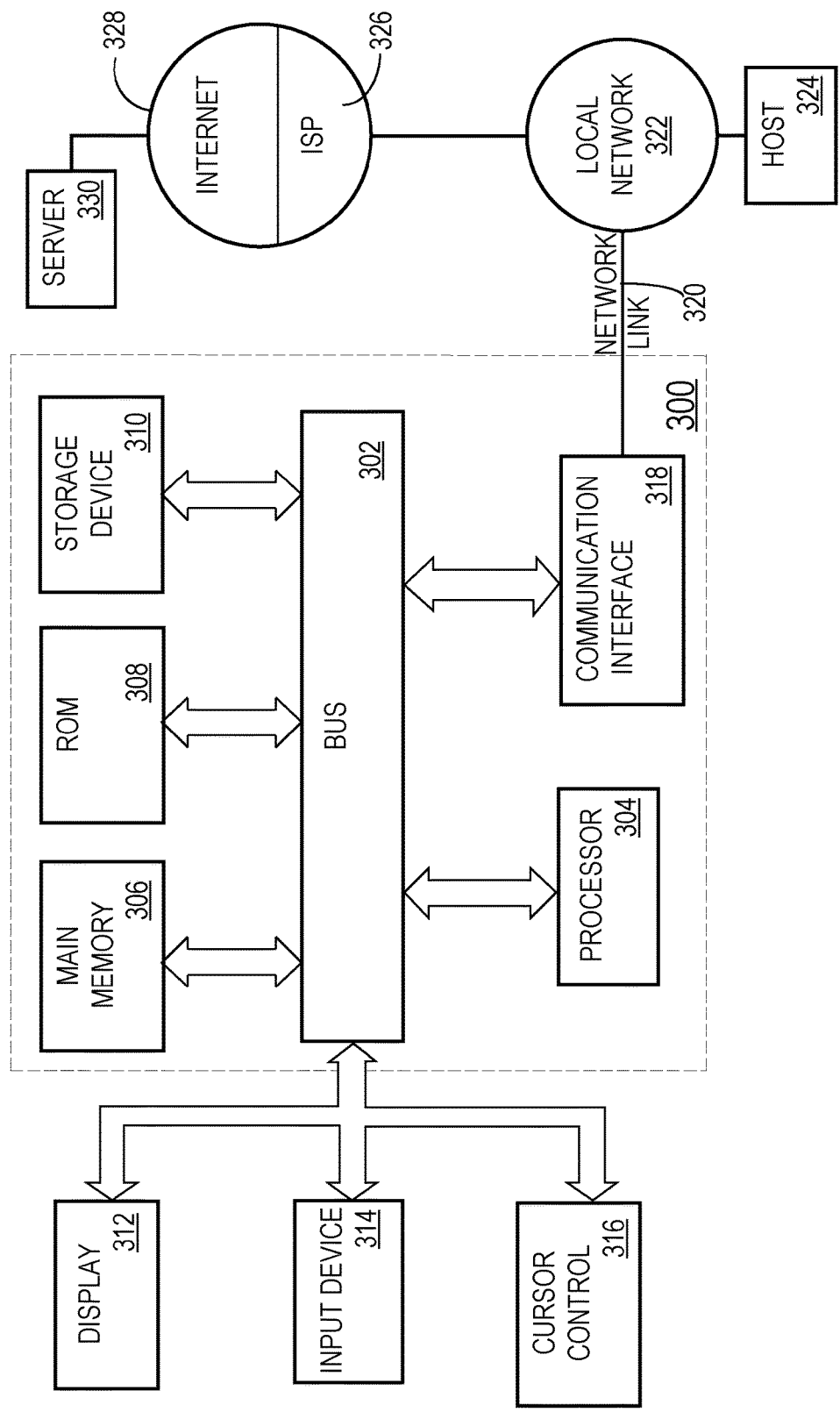
FIG. 3 is a block diagram that illustrates a computer system upon which an embodiment may be implemented.

For example, FIG. 3 is a block diagram that illustrates a computer system 300 upon which an embodiment may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

Benefits of Certain Embodiments

Embodiments of the disclosure provide a technical solution to an internet-centric problem of identifying malicious electronic messages when the sending account has a clean sending reputation. The clean sending reputation is inexorably tied to accounts which have been provided by an account provider computing device. Due to increases in storage and internet usage, the ease of obtaining an account for sending single messages has increased. Thus, to combat the clean sending reputations caused by the ease of obtaining messaging accounts, a computing device obtains information regarding messages received by the sending account to determine if the account was recently created for the purpose of sending malicious messages or whether the account is a genuine messaging account.

Certain embodiments additionally improve the efficiency and usage of the computing devices described herein. For example, the security computing device may act as an intermediary which receives the initial messages and makes a determination before sending the message or not sending the message to the client computing device, thereby decreasing the storage used by the client computing device and decreasing the risk of infection of a computer virus. Additionally, the security computing device may more efficiently identify the malicious messages by outsourcing analysis and scanning of URLs and attachments to separate computing devices.

What is claimed is:

1. A data processing method providing an improvement in computer security and comprising:
   receiving, at a security computing device executing one or more message security applications, an electronic digital message that is directed to a receiving account;
   using the security computing device, identifying a sending account associated with the electronic digital message and from which the electronic digital message was sent;
   transmitting, to a message server, a request to obtain a count of messages received by any of a plurality of primary recipient accounts from a plurality of secondary sending accounts where the sending account was a secondary recipient, and receiving the count of messages in response to the request;
   using the security computing device, determining that the sending account satisfies one or more received message criteria by determining that the count of messages is less than a threshold number of messages;
   in response to the determining, using the security computing device, performing a responsive action relating to the electronic digital message.

2. The method of claim 1, further comprising identifying one or more spam messages received by the sending account;
   wherein the determining that the count of messages is less than the threshold number of messages is performed based only on messages that do not include the one or more spam messages.

3. The method of claim 1, further comprising:
   identifying a provider of the sending account;
   transmitting, to the provider of the sending account, a request for the metadata;
   receiving, from the provider of the sending account, data identifying a number of messages received by the sending account;
   determining that the sending account satisfies the received message criteria based, at least in part, on the data identifying the number of messages received by the sending account.

4. The method of claim 1, further comprising:
   transmitting, to a recipient account data source, a request for data identifying a plurality of recipient accounts;
   receiving, from the recipient account data source, data identifying the plurality of recipient accounts;
   determining that the sending account is not identified in the data identifying a plurality of recipient accounts and, in response, determining that the sending account satisfies the received message criteria.

5. The method of claim 1, the responsive action comprising causing the electronic digital message to be quarantined.

6. The method of claim 1, the responsive action comprising identifying the sending account as a potential phishing account.

7. The method of claim 1, the responsive action comprising increasing a value identifying a likelihood that the sending account is a phishing account.

8. The method of claim 1, the responsive action comprising analyzing one or more hyperlinks in the electronic digital message.

9. The method of claim 1, the responsive action comprising causing scanning one or more attachments in the electronic digital message for viruses.

10. A data processing method providing an improvement in computer security and comprising:
receiving, at a security computing device implemented to execute one or more message security applications an e-mail message that is directed to a receiving account;
identifying, by the security computing device, a sending account associated with the e-mail message and from which the e-mail message was sent;
transmitting, to a host computer of the sending account, a request to obtain a count of messages received by any of a plurality of primary recipient accounts from a plurality of secondary sending accounts where the sending account was a secondary recipient, and receiving the count of messages in response to the request;
using the security computing device, in response to determining that the count of messages is less than a specified number, performing a responsive action relating to the e-mail message, the responsive action comprising one or more of:
causing the e-mail message to be quarantined;
marking the sending account as a potential phishing account;
increasing a value identifying a likelihood that the sending account is a phishing account;
analyzing one or more hyperlinks in the e-mail message;
scanning one or more attachments in the e-mail message for viruses;
dropping and not delivering the e-mail message to the receiving account;
transmitting one or more notifications or alerts relating to the e-mail message.

11. The method of claim 10, further comprising:
identifying one or more spam messages received by the sending account;
modifying the count of messages received by the sending account, as received in response to the request, by decrementing the one or more spam messages from the count.

12. The method of claim 10, further comprising:
receiving data identifying a plurality of recipient accounts;
determining that the sending account is not identified in the data identifying a plurality of recipient accounts and, in response, performing the responsive action.

13. A system comprising:
one or more processors;
a memory communicatively coupled to the one or more processors storing instructions which, when executed by the one or more processors, cause performance of:
receiving an electronic digital message that is directed to a receiving account;
identifying a sending account associated with the electronic digital message and from which the electronic digital message was sent;
transmitting, to a message server, a request to obtain a count of messages received by any of a plurality of primary recipient accounts from a plurality of secondary sending accounts where the sending account was a secondary recipient, and receiving the count of messages in response to the request;
determining that the sending account satisfies one or more received message criteria by determining that the count of messages is less than a threshold number of messages;
in response to the determining, performing a responsive action relating to the electronic digital message.

14. The system of claim 13, wherein the instructions, when executed by the one or more processors, further cause performance of identifying one or more spam messages received by the sending account;
wherein the determining that the count of messages is less than the threshold number of messages is performed based only on messages that do not include the one or more spam messages.

15. The system of claim 13, wherein the instructions, when executed by the one or more processors, further cause performance of:
identifying a provider of the sending account;
transmitting, to the provider of the sending account, a request for the metadata;
receiving, from the provider of the sending account, data identifying a number of messages received by the sending account;
determining that the sending account satisfies the received message criteria based, at least in part, on the data identifying the number of messages received by the sending account.

16. The system of claim 13, wherein the instructions, when executed by the one or more processors, further cause performance of:
transmitting, to a recipient account data source, a request for data identifying a plurality of recipient accounts;
receiving, from the recipient account data source, data identifying the plurality of recipient accounts;
determining that the sending account is not identified in the data identifying a plurality of recipient accounts and, in response, determining that the sending account satisfies the received message criteria.

17. The system of claim 13, the responsive action comprising causing the electronic digital message to be quarantined.

18. The system of claim 13, the responsive action comprising identifying the sending account as a potential phishing account.

19. The system of claim 13, the responsive action comprising increasing a value identifying a likelihood that the sending account is a phishing account.

20. The system of claim 13, the responsive action comprising analyzing one or more hyperlinks in the electronic digital message.

21. The system of claim 13, the responsive action comprising causing scanning one or more attachments in the electronic digital message for viruses.

* * * * *